US008376726B2

(12) United States Patent
Goller et al.

(10) Patent No.: US 8,376,726 B2
(45) Date of Patent: *Feb. 19, 2013

(54) DEVICE AND METHOD FOR HOT ISOSTATIC PRESSING CONTAINER HAVING ADJUSTABLE VOLUME AND CORNER

(75) Inventors: George Albert Goller, Greenville, SC (US); Raymond Joseph Stonitsch, Simpsonville, SC (US); Jason Robert Parolini, Greer, SC (US)

(73) Assignee: General Electric Company, Schenectady, NY (US)

( * ) Notice: Subject to any disclaimer, the term of this patent is extended or adjusted under 35 U.S.C. 154(b) by 583 days.

This patent is subject to a terminal disclaimer.

(21) Appl. No.: 12/544,449

(22) Filed: Aug. 20, 2009

(65) Prior Publication Data

US 2011/0044839 A1 Feb. 24, 2011

(51) Int. Cl.
*B29C 43/02* (2006.01)
*B28B 3/00* (2006.01)

(52) U.S. Cl. ....................................... 425/77; 425/405.2

(58) Field of Classification Search .................... 425/77, 425/78, 405.1, 405.2

See application file for complete search history.

(56) References Cited

U.S. PATENT DOCUMENTS

| | | | | |
|---|---|---|---|---|
| 3,677,673 | A * | 7/1972 | Shapiro | 425/78 |
| 4,582,681 | A | 4/1986 | Asari et al. | |
| 4,602,952 | A | 7/1986 | Greene et al. | |
| 4,935,198 | A * | 6/1990 | Tornberg | 419/8 |
| 4,938,673 | A | 7/1990 | Adrian | |
| 6,718,809 | B1 | 4/2004 | Utyashev et al. | |
| 7,604,468 | B2 * | 10/2009 | Harada et al. | 425/78 |

FOREIGN PATENT DOCUMENTS

JP 62116704 A 5/1987

OTHER PUBLICATIONS

Extended European Search Report issued in connection with EP Application 10173055.4, Oct. 15, 2010.

* cited by examiner

*Primary Examiner* — Richard Crispino
*Assistant Examiner* — Thukhanh Nguyen
(74) *Attorney, Agent, or Firm* — Dority & Manning, P.A.

(57) ABSTRACT

An improved container and method for forming billets using hot isostatic pressing is provided. The method and container allows for adjusting the volume of the container so as to obtain a billet of the desired shape based on selected powder charge for the container. In addition, the corner of the container can be adjusted to allow for elimination of edge effects and further shape control in the resulting billet.

8 Claims, 3 Drawing Sheets

DEVICE AND METHOD FOR HOT ISOSTATIC PRESSING CONTAINER HAVING ADJUSTABLE VOLUME AND CORNER

FIELD OF THE INVENTION

The subject matter disclosed herein relates to an improved container and method for forming billets using hot isostatic pressing and, more specifically, to a method and container having features that allow for adjusting the corner shape and volume of the container so as to obtain a billet of the desired shape and size.

BACKGROUND OF THE INVENTION

Metallurgical techniques have been developed for the manufacture of a metal billet or other object from metal powders created in a predetermined particle size by e.g., microcasting or atomization. Usually highly alloyed with Ni, Cr, Co, and Fe, these powders are consolidated into a dense mass approaching 100 percent theoretical density. The resulting billets have a uniform composition and dense microstructure providing for the manufacture of components having improved toughness, strength, fracture resistance, and thermal expansion coefficients. Such improved properties can be particularly valuable in the fabrication of e.g., rotary components for a turbine where high temperatures and/or high stress conditions exist.

The consolidation of these metal powders into a dense mass typically occurs under high pressures and temperatures in a process referred to as hot isostatic pressing (HIP). Typically, the powders are placed into a container (sometimes referred to as a "can") that has been sealed and its contents placed under a vacuum. The container is also subjected to an elevated temperature and pressurized on the outside using an inert gas such as e.g., argon to avoid chemical reaction. For example, temperatures as high as 480° C. to 1315° C. and pressures from 51 MPa to 310 MPa or even higher may be applied to process the metal powder. By pressurizing the container that is enclosing the powder, the selected fluid medium (e.g., an inert gas) applies pressure to the powder at all sides and in all directions.

The equipment required for HIP treatment is typically very costly and requires special construction. Due to the extreme temperatures and pressures, the container is substantially deformed or crushed as the volume of the powder decreases during the HIP process and the container becomes joined to the surface of the billet created by the compacted powder. Depending upon the desired shape for the resulting billet, all or portions of the surface of the container may be cut away i.e., by machining after the HIP process. In addition, portions of the billet may also be cut away depending upon the shape desired and the nature of deformations that occurred during the HIP process. Given that the powder used to manufacture the billet is typically very expensive, removal of portions of the billet is undesirable.

FIGS. 1 and 2 provide an exemplary illustration of the problems confronted using conventional containers in the HIP process. FIG. 1 provides a schematic illustration of a portion of a container 101 before being subjected to the extreme temperature and pressure of the HIP process. Container 101 encloses the powder mixture 105 intended for compaction and provides a seal to prevent the ingress of the fluid used for pressurization e.g., argon during the HIP process. Before pressurization, the walls 110 between top 100 and bottom 135 are basically straight and/or without deformation. Top 100 and bottom 135 are also undeformed before the HIP process.

FIG. 2 illustrates the same portion of container 101 after being subject to the HIP process. The conditions of the HIP process have now converted the powder into a metal billet 106. However, the change in density from powder to a solid metal has also resulted in a rather dramatic change in volume. As the volume decreased, container 101 also deformed with the change from powder 105 to billet 106. FIG. 2 illustrates that wall 110 has now taken on an arcuate shape, and top 100 and bottom 135 may undergo deformations as well. As a result, billet 106 also has a similar shape sometimes referred to as an hour-glass shape.

Unfortunately, depending upon the shape desired for billet 106 (or the shape of the ultimate component to be constructed from billet 106), the deformations shown in FIG. 2 may be undesirable because the resulting shape for billet 106 may require the removal of valuable material from its surface. For example, assuming a cylindrical outer surface is needed along wall 110 of billet 106, container 101 and billet 106 may need to be cut i.e., machined along line 130 in order to obtain the desired outer surface. In addition to losing all or portions of container 101, the corners 107 of container 101 do not provide shape control for the respective edges of billet 106. Coupled with the arcuate deformation of outer wall 110, significant amounts of the billet 106 will be lost at portions 115 along the top and bottom of container 101. Because of the substantial costs of the original powder, this loss is undesirable. In addition, although less significant than the powder costs, portions of container 101 are also lost as a result of the machining process. In certain applications, it may be desirable to retain the material of container 101 on the resulting billet for inclusion on the final work piece. In such cases, removal of the container to shape the billet is to be avoided.

Additionally, the size of container 101 is not adjustable for different powder charges. More specifically, once container 101 has been manufactured, the amount of powder that can be loaded into the interior of container 101 is fixed which, in turn, provides for a fixed billet size. Again, the removal of material from billet 106 to reduce it to a desired size is undesirable. The manufacture of multiple containers solely to address different anticipated volumes needed for different powder charges is also undesirable.

Therefore, an improved device and method that provides shape control at the corner of the container and that provides for the reduction or elimination of powder loss in connection with HIP treatment would be useful. An improved device and method that also provides a volume adjustable container for HIP processing would also be useful.

BRIEF DESCRIPTION OF THE INVENTION

The present invention provides an improved device and method for forming billets using hot isostatic pressing and, more specifically, to a method and container having features that allow for adjusting the corner shape and volume of the container so as to obtain a billet of the desired shape and size. Objects and advantages of the invention will be set forth in part in the following description, or may be obvious from the description, or may be learned through practice of the invention.

In one exemplary embodiment, the present invention provides a container for compaction processing of a powder into a billet. The container includes an outer wall that defines an axial direction extending along the container. The outer wall defines an interior of the container. A container top is provided that includes a crown connected to a rim. The rim extends around a periphery of the crown. The container top is positioned for mating receipt with the outer wall and with the rim extending into the interior of the container. The rim of the container top is configured for sliding along the outer wall such that the volume of the interior is selectively adjustable. The rim defines a chamfer at an angle α from the axial direction. The chamfer increases in thickness along a direction towards the crown. The container also includes a container bottom received by the outer wall.

In another exemplary embodiment, the present invention provides a container for compaction processing of a powder into a billet. The container includes an outer wall that defines an axial direction extending along the container. The outer wall defines an interior of the container. A container top and a container bottom are provided. The container top and container bottom each include a crown connected to a rim. The rim extends around a periphery of the crown for both the container bottom and the container top. The container top and the container bottom are each positioned for mating receipt by the outer wall with the rim of each of the container top and the container bottom. As a result, the container top and the container bottom each extend into the interior of the container. The rims of the container top and the container bottom are configured for sliding along the outer wall such that the volume of the interior is selectively adjustable. The rims of the container top and the container bottom each define a chamfer at an angle α from the axial direction such that each of the chamfers increases in thickness in a direction towards the crown.

In still another exemplary aspect of the present invention, a method for improving the use of material during hot isostatic pressing is provided. The method includes the steps of providing a container for the receipt of a powder intended for compaction. The container includes an outer wall that defines an axial direction extending along the container. The outer wall defines an interior of the container. A container top is provided that includes a crown connected to a rim. The rim extends around a periphery of the crown. The container top is positioned for mating receipt by the outer wall with the rim extending into the interior of the container. The rim of the container top is configured for sliding along the outer wall such that the volume of the interior is selectively adjustable. The rim defines a chamfer at an angle α from the axial direction. The chamfer increases in thickness in a direction towards the crown. The container bottom is received by the outer wall. The method also includes selecting a position for the container top relative to the outer wall so as to provide for the receipt of a selected volume of the material intended for hot isostatic pressing. A nonzero value for angle α is determined such that after hot isostatic pressing of the powder the resulting billet will have a predetermined shape along the container top.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of exemplary embodiments of the present invention, directed to one of ordinary skill in the art, is set forth in the specification, which makes reference to the appended figures, in which.

DETAILED DESCRIPTION

Figure 1:
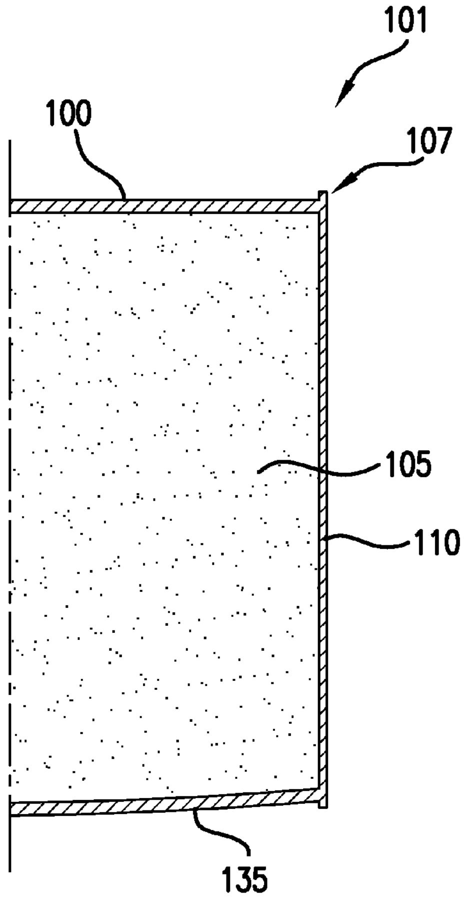
FIG. 1 is a schematic cross-section along one side of a container before subjection to the HIP process.

To provide advantageous improvements as described herein, the present invention provides an improved container and method for forming billets using hot isostatic pressing and, more specifically, to an improved container and method having features that allow for adjusting the corner shape and volume of the container so as to obtain a billet of the desired shape and size. For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 3:
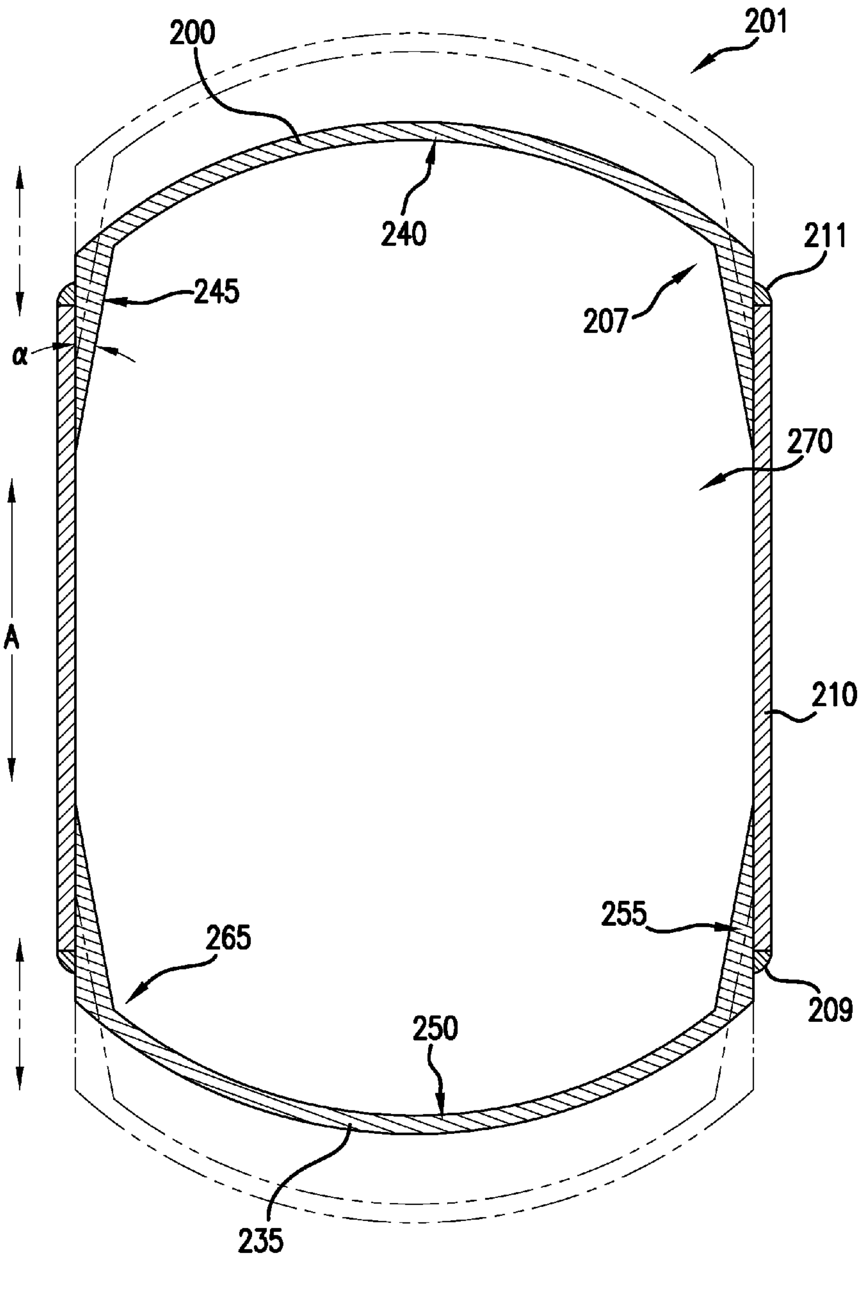
FIG. 3 provides a cross-sectional view of an exemplary embodiment of the present invention. The phantom lines illustrate adjustment to the volume of the container by sliding of the container top and bottom.

The cross section of exemplary embodiment of a container 201 according to the present invention is shown in FIG. 3. Container 201 includes an outer wall 210 that defines an axial direction A extending along the length of container 201. Axial direction A is chosen arbitrarily for purposes of defining an angle α as will be described below. Additionally, container 201 is illustrated as cylindrical in shape. Using the teaching disclosed herein, however, one or skill in the art will understand the present invention can be applied to containers of various other shapes as well.

Container 201 includes a container top 200 and a container bottom 235. Container top 200 includes a crown 240 connected about its periphery to a rim 245. Crown 240 and rim 245 are preferably manufactured integrally as one piece to form container top 200 though other constructions may also be used.

Container top 200 is constructed of a size and shape that it can be received in a mating or complementary fashion into outer wall 210. For example, container top 200 is circular in shape to match the cylindrical shape of outer wall 210, but top 200 has a slightly smaller diameter than outer wall 210. Accordingly, rim 245 of top 200 fits within outer wall 210 extending into the interior 270 of container 201. The tolerances for outer wall 210 and rim 245 allow for rim 245 to slide along the axial direction A. Accordingly, the position of container top 200 can be readily adjusted such that the volume of powder held by the interior 270 of container 201 can be selectively determined.

Container bottom 235 is constructed in a manner very similar to container top 200. Specifically, container bottom 235 includes a rim 255 around a crown 250. Rim 235 is also received into the interior 270 of container 201 and is configured to slide along the axial direction A. As such, container bottom 235 can also be used for adjusting the volume of the interior of container 201.

Accordingly, container top 200 and bottom 235 allow for adjustability of amount of powder to be loaded into the interior 270 of container 201. In one exemplary aspect of use and depending upon the desired shape and volume for the resulting billet, container bottom 235 is positioned along the axial direction A. The final position is permanently fixed with weld 209. Powder is then loaded into container 201 in the desired volume. Container top 200 is then inserted into the outer wall 210 and slid into the desired position based on the volume of powder loaded into container 201. The final position of container top 200 is then permanently fixed using weld 211.

The exemplary embodiment of FIG. 3 illustrates container 201 having both an adjustable container top 200 and adjustable container bottom 235. Alternatively, container 201 could be constructed such that one of top 200 or bottom 235 can be moved axially to allow for adjustment of the volume of interior 270. In addition to the use of alternative shapes for container 201 as previously indicated, different sizes and proportions for container 201 may also be applied.

Figure 2:
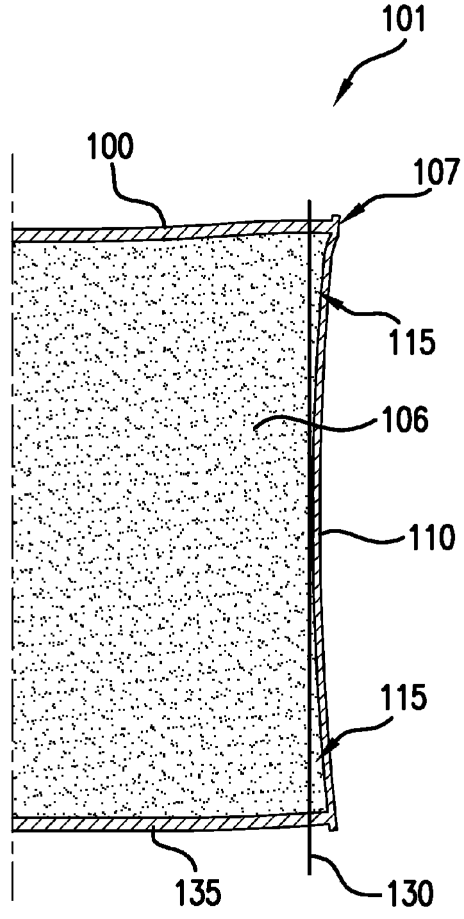
FIG.2 Prior Art
FIG. 2 is a schematic cross-section along one side of the container of FIG. 1 after undergoing the pressure and temperature of the HIP process.

Each rim 245 and 255 defines a chamfer at an angle α from axial direction A. More specifically, the cross-section of each rim 245 and 255 increases in thickness along a direction toward their respective crowns 240 and 250. The rate of increase in thickness is determined by angle α, which is typically in the range of about 1 degree to about 10 degrees. Angle α is selected based on the anticipated deformation of container 201 and the desired shape for the billet resulting from the HIP process. For example, an angle α of about 1 degree to about 10 degrees can eliminate an unwanted edge effect that occurs using conventional containers such as that shown in FIG. 1 and FIG. 2.

Figure 4:
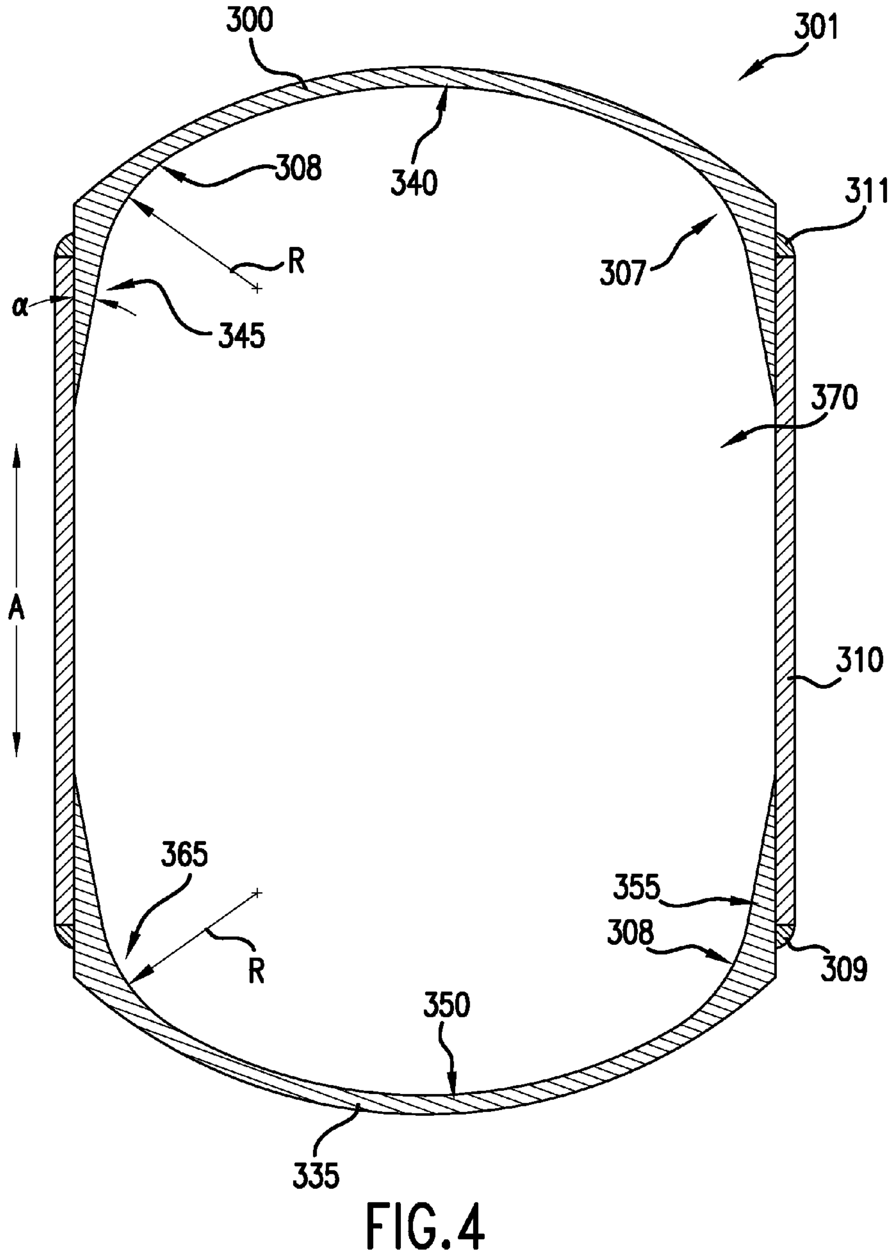
FIG. 4 provides a cross-sectional view of an exemplary embodiment of the present invention. The phantom lines illustrate adjustment to the volume of the container by sliding of the container top and bottom. Radius lines also indicate interior surface features of the container top and bottom.

For certain billets, further shape control near the container top 200 and container bottom 235 may be desired. For example, container 201 contains corners 207 and 265 that may lead to undesired edges in the billet after the HIP process. Turning now to FIG. 4, container 301 contains features similar to container 201 with like reference numerals representing the same or analogous features. However, along the interior surface 308 of container top 300, a radius of curvature R has been added over a portion where surface 308 joins rim 345 and crown 340. A similar radius of curvature R is used for container bottom 335. This radius of curvature allows for additional shape control over the resulting billet along the corners (e.g., corners 207 and 265 shown in FIG. 3) of the container 301. Preferably, container 301 is originally constructed with the desired radius of curvature R. However, if sufficient thickness is provided in the container top or container bottom, the radius of curvature R may also be added after the original construction by e.g., machining the corner of the container.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A container for compaction processing of a powder into a billet, the container comprising:

an outer wall that defines an axial direction extending along the container, said outer wall defining an interior of the container;

a container top comprising a crown connected to a rim, said crown having an arcuate profile along its width, said rim extending around a periphery of the crown, said container top positioned for mating receipt by said outer wall with the rim extending into the interior of the container, the rim of said container top configured for sliding along the outer wall such that the volume of the interior is selectively adjustable, the rim defining a chamfer at an angle α from the axial direction, wherein the chamfer increases in thickness in a direction towards the crown and the angle α is in the range of about 1 degree to about 10 degrees; and a container bottom received by the outer wall.

2. A container for compaction processing of a powder into a billet as in claim 1, wherein said container top defines an interior surface, said interior surface having a profile defined by a radius of curvature over a portion of said interior surface joining the rim and the crown of said container top.

3. A container for compaction processing of a powder into a billet as in claim 1, further comprising a weld joining said container top and said outer wall so as to fix the volume of the interior of the container.

4. A container for compaction processing of a powder into a billet as in claim 1, wherein said outer wall is substantially cylindrical in shape.

5. A container for compaction processing of a powder into a billet, comprising:

an outer wall that defines an axial direction extending along the container, said outer wall defining an interior of the container;

a container top and a container bottom, said container top and said container bottom each comprising a crown connected to a rim that extends around a periphery of their respective crown, said container top and said container bottom each positioned for mating receipt by said outer wall with the rim of each of said container top and said container bottom so that said container top and said container bottom each extend into the interior of the container, each of the rims of said container top and said container bottom configured for sliding along the outer wall such that the volume of the interior is selectively adjustable, and each of said rims of said container top and said container bottom defining a chamfer at an angle α from the axial direction such that each of the chamfers increases in thickness in a direction towards the crown and the angle α is in the range of about 1 degree to about 10 degrees.

6. A container for compaction processing of a powder into a billet as in claim 5, wherein said container top and said container bottom each define an interior surface having a profile defined by a radius of curvature over a portion of said interior surface joining the rim and the crown for each of said container top and said container bottom.

7. A container for compaction processing of a powder into a billet as in claim 5, further comprising a pair of welds joining said container top and said container bottom to said outer wall so as to fix the volume of the interior of the container.

8. A container for compaction processing of a powder into a billet as in claim 5, wherein said outer wall is substantially cylindrical in shape.

* * * * *